Nov. 18, 1969    H. C. WOODMAN ET AL    3,478,701
BOXCAR CONSTRUCTION
Filed Jan. 31, 1968    5 Sheets-Sheet 2

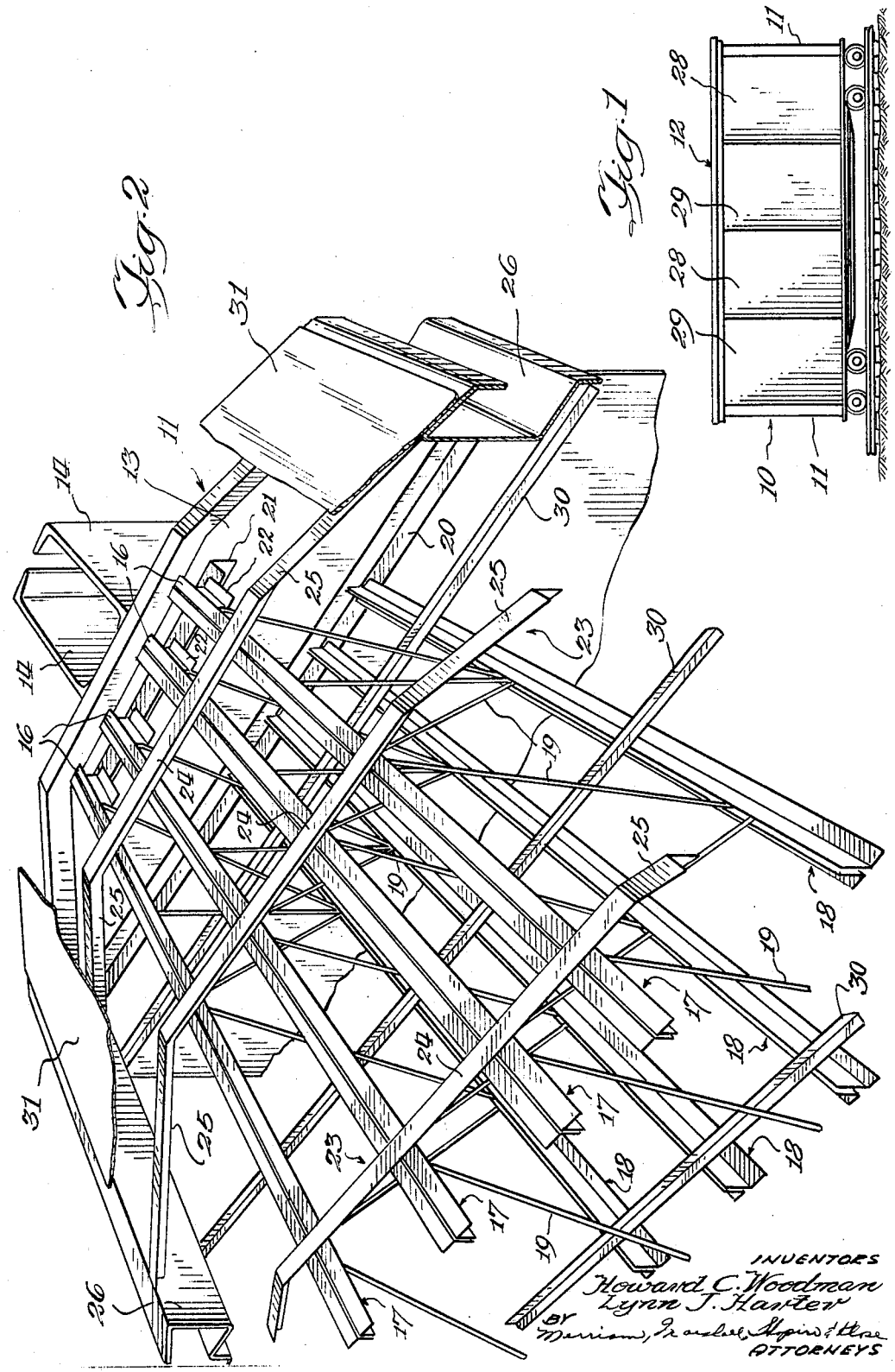

INVENTORS
Howard C. Woodman
Lynn J. Harter
BY Merriam, Marshall, Shapiro & Hose
ATTORNEYS

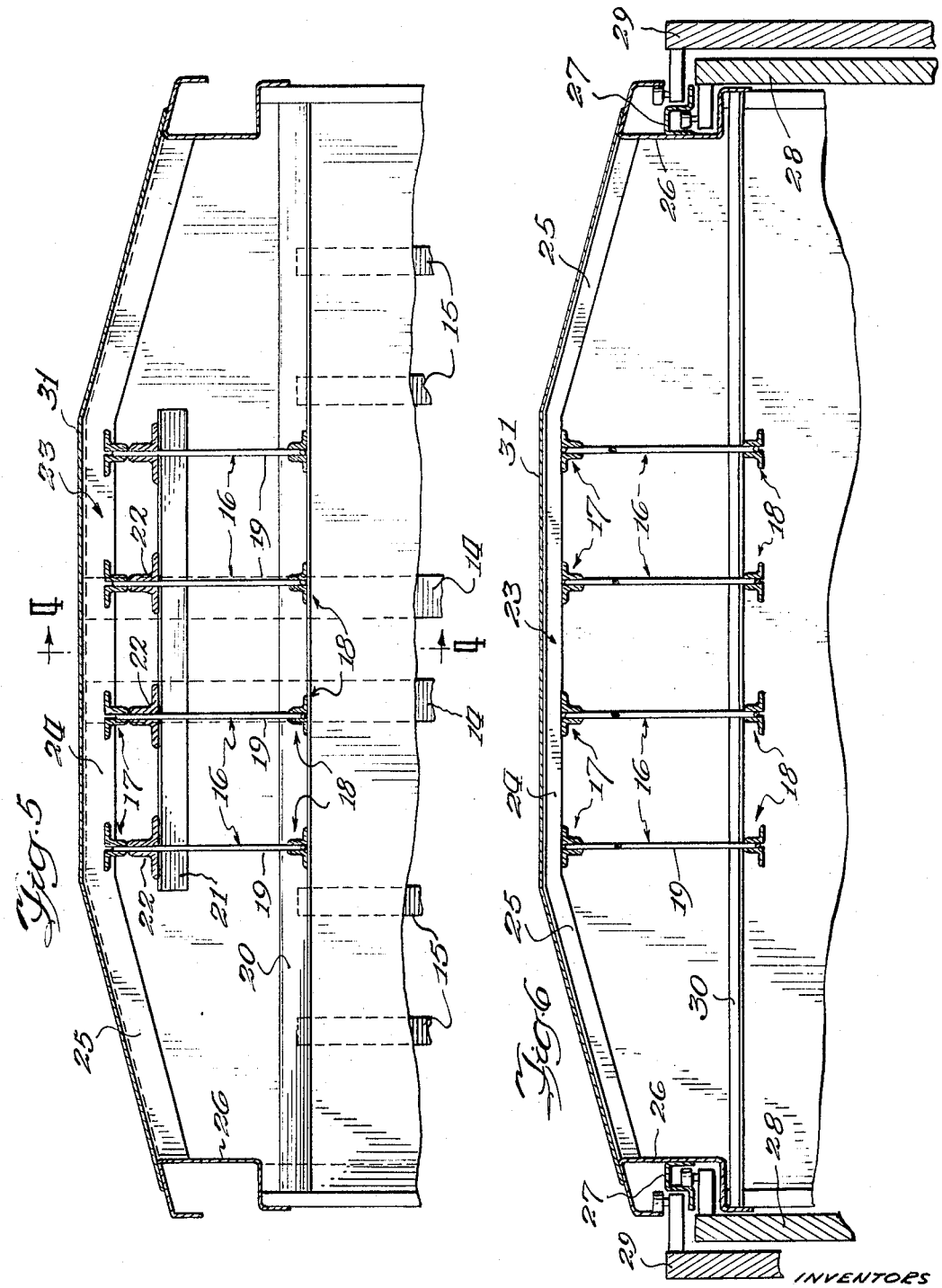

Nov. 18, 1969     H. C. WOODMAN ET AL     3,478,701
BOXCAR CONSTRUCTION
Filed Jan. 31, 1968     5 Sheets-Sheet 4
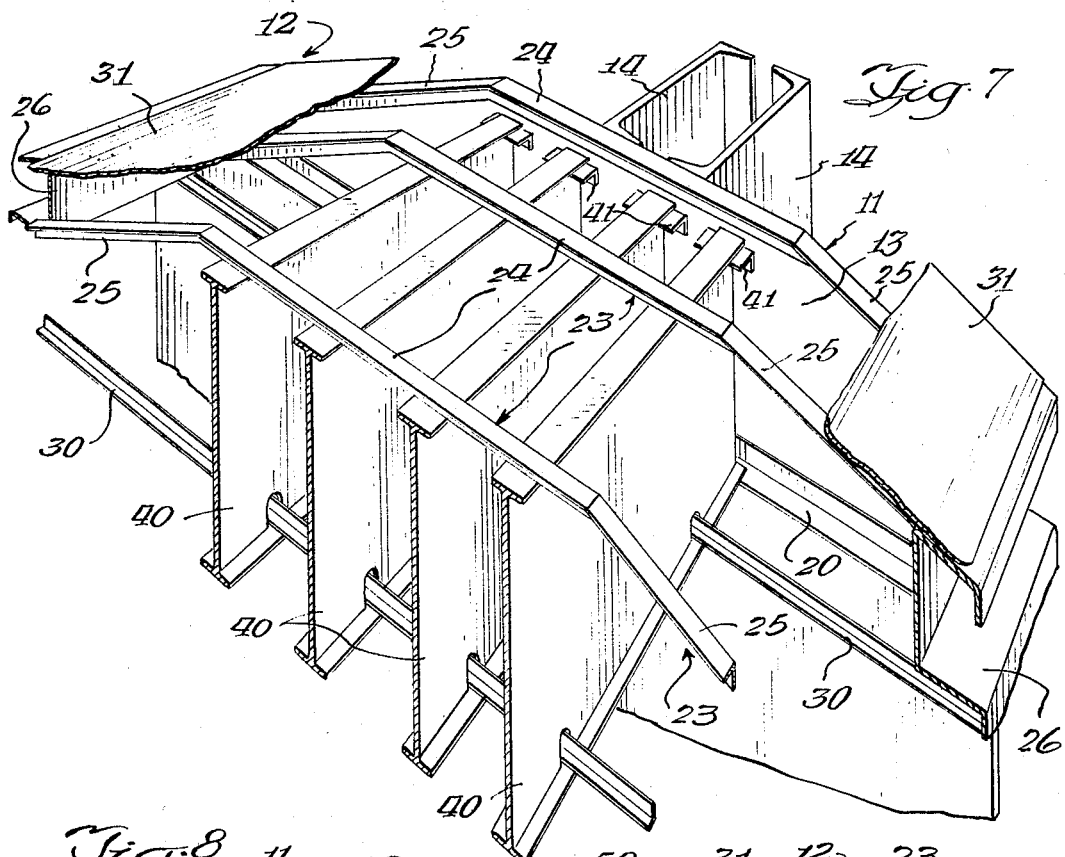
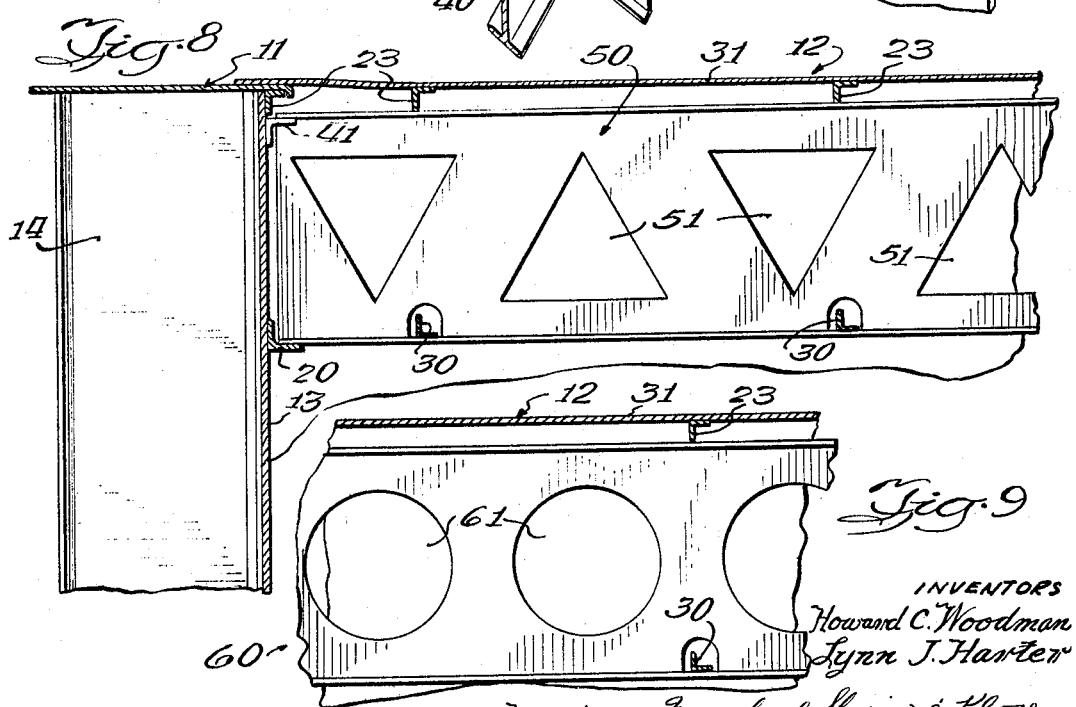
INVENTORS
Howard C. Woodman
Lynn J. Harter
BY Merriam, Marshall, Shapiro & Klose
ATTORNEYS

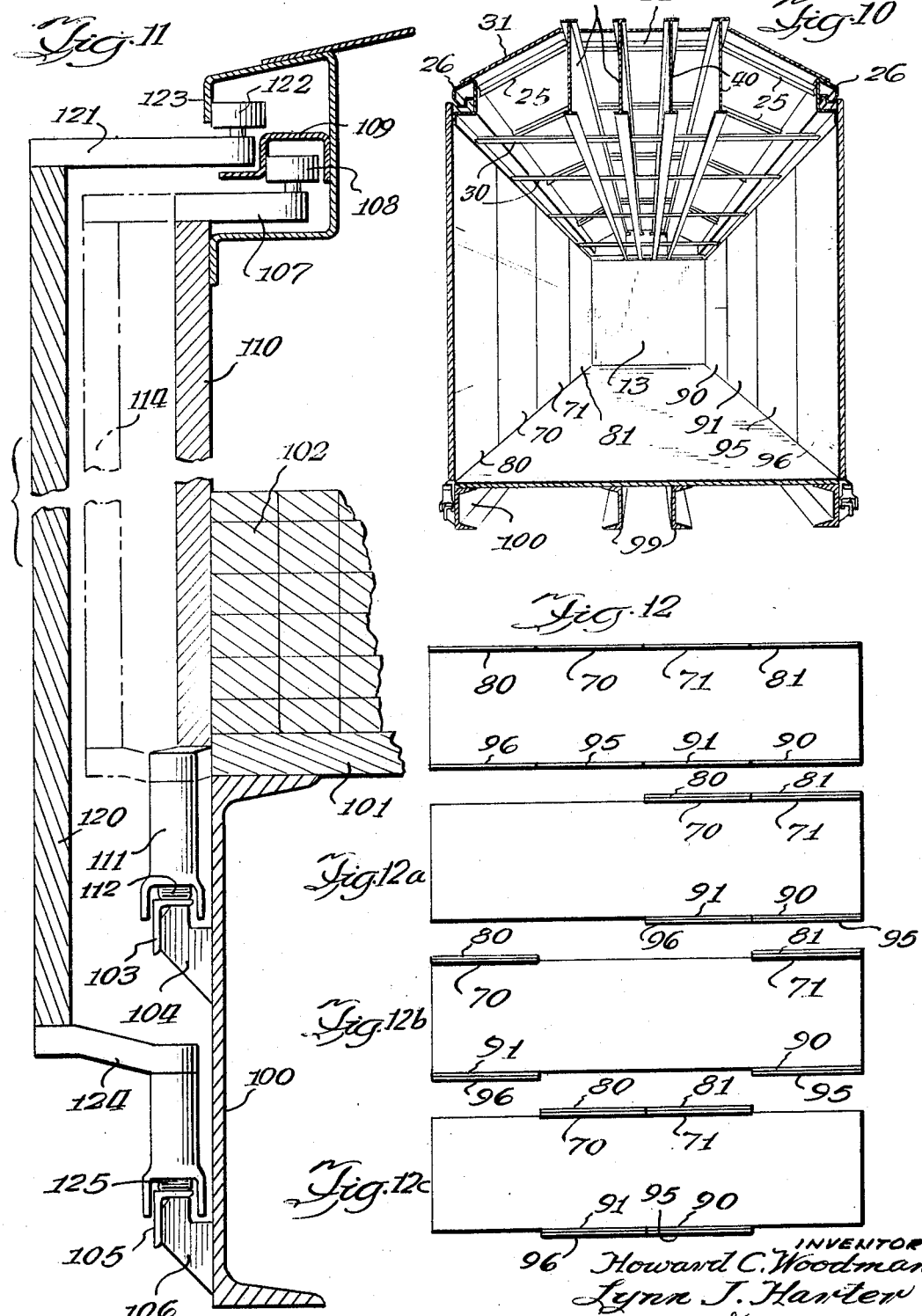

United States Patent Office 3,478,701
Patented Nov. 18, 1969

3,478,701
BOXCAR CONSTRUCTION
Howard C. Woodman, Frankfort, Ill., and Lynn J. Harter, Hobart, Ind., assignors to Thrall Car Manufacturing Company, Chicago Heights, Ill., a corporation of Illinois
Continuation-in-part of application Ser. No. 624,540, Mar. 20, 1967. This application Jan. 31, 1968, Ser. No. 707,002
Int. Cl. B61d 17/00
U.S. Cl. 105—404                                              12 Claims

ABSTRACT OF THE DISCLOSURE

Disclosed is a freight-carrying vehicle having its roof supported only by bulkheads at each end of the vehicle. The roof is carried by beams or joists extending between the bulkheads. The roof supports side doors without further structural members along the sides leaving the floor and sides completely clear of obstructions.

---

This application is a continuation-in-part of pending application Ser. No. 624,540 filed Mar. 20, 1967, now abandoned.

This invention relates to enclosed freight-carrying vehicles, and especially railroad boxcars. More particularly, it is concerned with a freight-carrying vehicle having a roof structure supported only by end bulkheads without roof supporting side walls or internal columns.

In conventional freight-carrying vehicles, vertical sidewalls attached to an underframe are used to support a roof structure. Sidewalls of this type use closely-spaced, vertical load-bearing structural members, the spacing and number of which limits the number and size of side access doors to ones which are relatively narrow with respect to the length of the vehicle body. Such narrow doors restrict versatility of the vehicle by restricting the loads which can be put in and carried by the vehicle. For example, in lumber service, long timbers cannot be conveniently loaded into the vehicle enclosed compartment.

To permit versatility in the use of enclosed freight-carrying vehicles, modifications in the construction of road and rail vehicles which permit the use of side doors which will provide an opening approximately half the length of the vehicle can be effected. Even in vehicles wherein special designs have been used to effect this objective, the type of construction used impedes effective loading of the vehicle. There are many instances when loading and unloading would be greatly facilitated by having doors constitute the entire side walls of the vehicle. With better access to the vehicle interior, more flexibility in using material handling personnel and equipment is achieved thus increasing efficiency, lowering costs and making the job easier.

There is provided in accordance with this invention a freight-carrying vehicle for road or rail service characterized by a roof which requires no side wall or internal support thus permitting the sides to constitute all-door movable closures. The roof uses a plurality of beams or trusses supported by bulkheads at each end and has strength and rigidity for supporting side wall doors along the entire length of one or both sides of the vehicle body. This leaves the entire floor area of the vehicle devoid of obstructions which would interfere with freight handling therein. The use of beams or trusses to support the roof eliminates the need for any other roof supports such as supporting side walls or internal columns and does so efficiently at low construction cost.

As used herein "beam" refers to a member having a solid web. "Truss" is used in its conventional sense and means a two force member or structure. A beam which has had appropriately positioned cutout or open areas in the web is thereby transformed into a truss.

Although this invention has broad application in the construction of load-carrying vehicles, it has particular use in railroad freight or boxcars. For this reason, and to facilitate an understanding of the invention, the following description will concentrate on its use in freight car construction. It is understood, however, that the invention is not so limited since it can be used in truck trailers, unitized shipping containers of large size and other shipping structures.

In the drawings, which illustrate various embodiments of the invention:

FIGURE 1 is a side view of a railroad freight car having all door sides and a plurality of beams or trusses to support the roof;

FIGURE 2 is a perspective view of the inside end of a freight car, made according to this invention, showing trusses of the bar-joist type supporting the roof;

FIGURE 5 is a vertical sectional view taken along the line 5—5 of FIGURE 4 and shows the top inside end of the freight car;

FIGURE 6 is a vertical sectional view taken along the line 6—6 of FIGURE 4;

FIGURE 7 is a perspective view of the inside end of a freight car, made according to this invention, showing a plurality of beams which run the length of the car, and are supported at the ends by the upper part of the bulkheads, and support the roof wtihout side walls or internal posts or columns;

FIGURE 8 is a side sectional view similar to FIGURE 4 and shows a truss with triangular openings;

FIGURE 9 is a partial side sectional view of a roof supporting truss having circular openings;

FIGURE 10 is an internal perspective view from one end of a freight car made according to this invention showing the smooth interior floor, side and end surfaces which are provided;

FIGURE 11 is a vertical sectional view through one side area of a freight car of this invention showing the manner in which the doors can be arranged; and FIGURES 12 to 12c are schematic drawings illustrating some of the possible positions in which the doors on each side of a freight car produced according to this invention can be placed for loading or unloading the car.

For convenience, similar parts or elements which appear in the different figures will be identified, so far as practical, by the same number.

As shown in FIGURE 1, the all-door freight-carrying vehicle 10 therein illustrated and embodying the invention employs an underframe having side sills, end sills and a floor on said underframe, all of which are common to such vehicles. At each end of the freight-carrying vehicle or freight car 10 are vertical bulkheads 11 which support roof 12.

Figure 3:
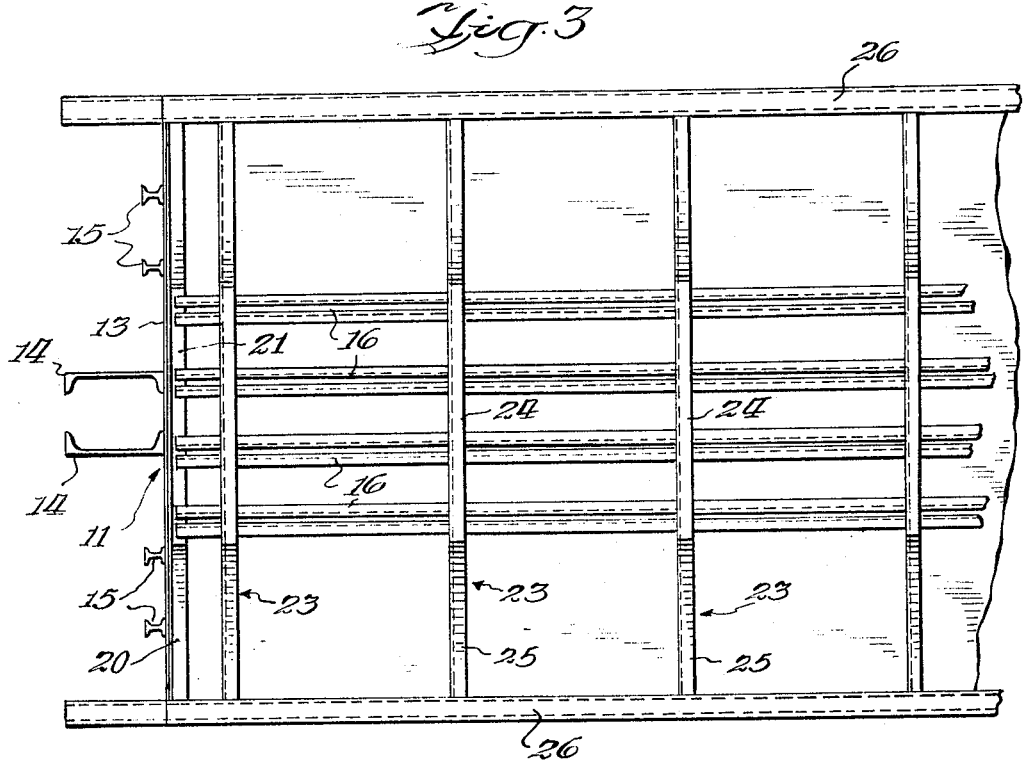
FIGURE 3 is a top view of one end of the freight car of FIGURE 2 without roof plates.
Figure 4:
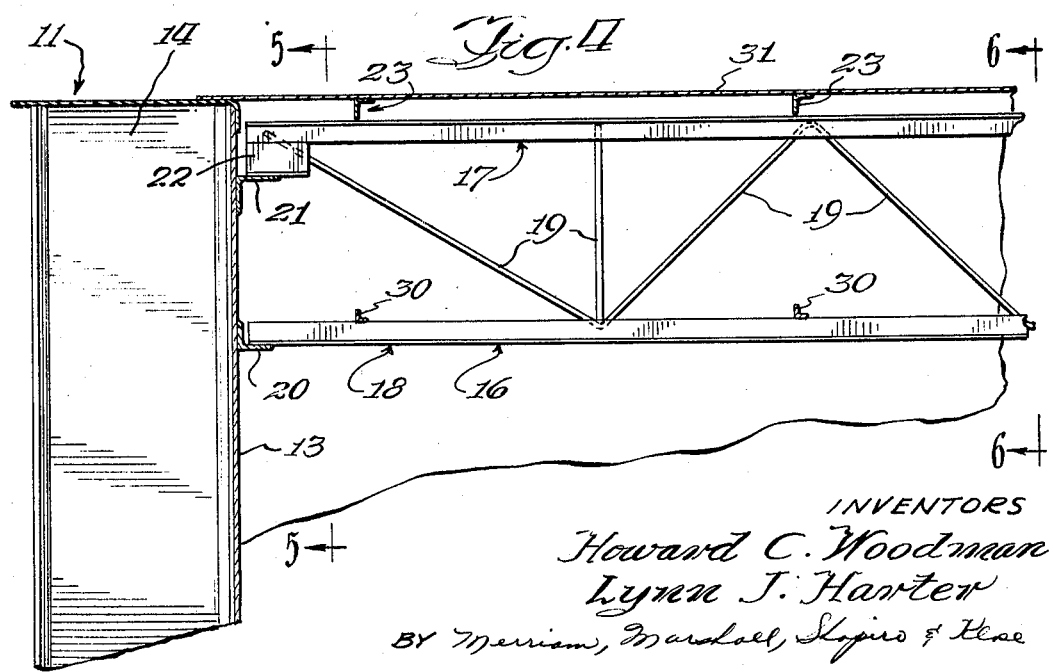
FIGURE 4 is a side sectional view taken along the line 4—4 of FIGURE 5 and shows in vertical section the ends of the bar-joist type trusses supported by the bulkhead at one end of the freight car.

With reference to FIGURES 2 to 4, which illustrate one embodiment of the invention, each bulkhead 11 has a vertical wall 13 of metal plate extending the width of the vehicle. Wall 13 is supported by a pair of large metal channels 14 set vertically centrally of the vehicle axis and joined securely to the underframe. Wall 13 is further reinforced and supported by a plurality of vertically positioned I-beams 15.

Each bulkhead 11 supports the ends of a plurality of trusses of the bar-joist type 16 which extend the full length between the bulkheads. At least two bar-joist type trusses are used even for the smallest vehicles to provide adequate roof support and for large vehicles three, four and more bar-joist type trusses are used, with the size and number employed being selected to be adequate for the purpose. The size of the bar-joist type trusses used should be such as not to unduly lower the ceiling clearance in the vehicle.

The bar-joist type trusses 16 are spaced apart from each other and positioned parallel to one another. They are supported near the top of the bulkhead.

Each bar-joist type truss comprises an upper chord 17 and a lower chord 18 held apart, advisably in parallel arrangement, by bar struts 19 positioned triangularly between the chords. Chords 17 and 18 are each shown composed of two structural metal angles positioned with their vertical flanges side-by-side and with the struts secured therebetween. The upper face of chord 17 and the lower face of chord 18 are flat since the vertical flanges of the angles are directed toward each other and to the inside of the bar-joist.

The ends of the lower chords 18 are supported by structural angle 20 secured horizontally to bulkhead wall 13. Similarly, structural angle 21 supports upper chord 17 which has inverted short length metal angles 22 joined at the bottom of the chord to provide enhanced supporting means.

Placed on top of, and supported by, the bar-joist type trusses 16 is a plurality of spaced apart roof rafters 23 positioned parallel to one another and in a direction substantially normal to the bar joists. The rafters advisably have a horizontal or flat central portion 24 which rests on the bar joists and declined cantilevered portions 25 projecting therefrom.

Supported by the rafters, at or near each of the ends thereof on each side of the roof, is a side plate 26, generally located at and forming part of the vehicle eave. Side plate 26 runs the length of the vehicle body from one bulkhead to the other and it is supported over its length by the rafters. The specific shape of the side plate can vary according to the type of doors used to close the vehicle sides. The shape shown, together with added channel member 27, are designed to support plug doors 28 and sliding doors 29 of standard design shown schematically in FIGURE 1.

For added support it is usually advisable to position a plurality of horizontal stringers 30 normal to the bar-joist type trusses and supported by the lower chords 18. Stringers 30 extend the width of the vehicle body and are connected at each end to the lower part of side plates 26.

The roof covering is formed of a plurality of metal plates or sheets 31 firmly joined to roof rafters 23 and side plates 26.

Obviously, trusses very similar to bar-joist type trusses can be employed such as where the bar struts 19 are replaced with angle or channel struts and the angle chords 17 and 18 are replaced by T-shaped, channel shaped or other suitably shaped chords. For the purposes of this invention such trusses are considered as being within the term "bar-joist."

The bar-joist type truss roof construction of this invention is generally less expensive, light weight and more easily constructed than the other embodiments described hereinafter using I-beams, and trusses formed from I-beams, and thus is considered the most suitable structure. However, all vehicles produced according to this invention can have door closures which open for part of or the entire length of the body. All sliding doors, all plug doors, all overhead suspension tamber doors or combinations of such doors can be used to close part of, or the entire side of, one or both sides of the vehicle.

Although no additional roof support is needed, the subject invention can be suitably used in combination with other structural arrangements which provide additional roof supporting means such as rigid load supporting side wall portions and/or roof supporting columns. However, it is generally not advisable, and certainly is not necessary, to use any additional roof supporting means than a plurality of beams or trusses extending from one bulkhead to the other bulkhead.

Welding is the preferred means of joining the various components together in constructing the vehicle although riveting and bolting can also be used, at least in part.

The embodiment of this invention shown in FIGURES 7 and 10 uses I-beams 40 instead of trusses as in FIGURE 2 but in all other significant structural aspects the roof supporting structure in each embodiment is the same except for minor details. Thus, I-beams 40, four of which are shown, are supported at their lower ends by angle 20 horizontally joined to the inside wall 13 of bulkhead 11 and at their upper ends by angle tabs 41 joined to bulkhead wall 13. The I-beams 40 are located in upright, parallel side-by-side position and extend the full length of the vehicle between the bulkheads at each end. The I-beams 40 are supported only by the bulkheads with no internal columns or posts being used as intermediate supports. The central portion 24 of rafters 23 rests on the top surface of beams 40 and the cantilevered ends 25 of rafters 23 are joined to side plates 26. A series of stringers 30 tie the lower part of the I-beams 40 together and extend to the bottom part of side plates 26 on each side of the roof 12. Channels 14 support bulkhead 11 in the same way as described with reference to FIGURE 2. The use of beams to support the roof is not considered nearly as satisfactory as the use of trusses. This is primarily because the size of beams required increases the weight of the roof substantially over the roof weight of a trussed roof and as a result the weight carrying capacity of the vehicle would have to be reduced proportionately.

FIGURE 8 illustrates a structure much like the structure of FIGURE 4 except that the bar-joist of FIGURE 4 has been replaced by a truss 50 formed by making triangular cutouts or openings 51 in the web. Except for the triangular openings, truss 50 is in all other respects like I-beam 40. Truss 50 is supported at its ends to bulkhead wall 13 by angle 20 and angle tabs 41 as described with reference to I-beam 40 in FIGURE 7.

FIGURE 9 shows truss 60 with circular openings. In other respects, truss 60 is like truss 50. In place of triangular or circular openings in trusses 50 and 60, openings of other shapes can be used to minimize truss weight while maintaining the necessary strength to support roof 12.

One of the important characteristics achieved by the novel roof construction of this invention, which eliminates roof supporting side walls and interior columns, is the provision of smooth interior surfaces devoid of depressed or raised areas along the entire sides of the vehicle. The absence of smooth interior surfaces would make loading and unloading the vehicle troublesome since goods being shipped can interfere with operation of the door during loading and unloading and be damaged by the edges around the recessed area. By eliminating roof supporting side walls, each entire side of the vehicle between its bulkheads can be provided with a plurality of movable doors which when in closed position provide an entirely smooth interior surface for the load carrying length and height of the vehicle.

FIGURE 10 shows schematically door arrangements which can be used to provide such smooth interiors. Thus, one or both sides of the vehicle can have two sliding doors 70 and 71 supported by tracks at the top and bottom and two plug doors 80 and 81 supported by separate tracks at the top and bottom. In closed position the series of doors forms a smooth interior wall surface for the length of the vehicle. When the plug doors 80 and 81 are opened they move outwardly sufficiently far for them to roll over the front of the sliding doors 70 and 71 thereby permitting movement of the sliding doors and formation of an opening of up to one-half of the side of the vehicle.

The other side of the vehicle of FIGURE 10 is shown provided with a series of four plug doors although it should be understood that both sides of the vehicle can be provided with all plug doors. Plug doors 90 and 91 are supported at their tops and bottoms by suitable tracks, and plug doors 95 and 96 by separate tracks at their tops and bottoms. Plug doors 95 and 96 are constructed to move out sufficiently far when opened to slide over the exterior faces of plug doors 90 and 91 with sufficient clearance to provide access to up to one-half of the side of the vehicle.

The drawings forming FIGURES 10 and 11 illustrate in more detail supporting structure for the doors. Side sills 100 and center sill 99 support floor 101 shown bearing boxed material 102. Side sill 100 supports longitudinal door track 103 by brackets 104 and longitudinal door track 105 by brackets 106. Plug door 110 is movably held in place at the top by arm 107 which supports roller 108 in longitudinal track channel 109 and at the bottom by arm 111 which holds roller 112 which rides on track 103. Phantom lines 114 show the position to which plug door 110 can be moved out when opened. Plug door 120 is supported at the top by arm 121 and roller 122 which bears against flange 123 of side plate 26 thereby providing a supporting track. The bottom of plug door 120 is supported by arm 124 holding roller 125 which rides on track 105. By means of arms 121 and 124 plug door 120 is moved into and out of closed position. When moved out to open position it can be rolled over and beyond the exterior face of plug door 110 to thereby provide access to the vehicle interior. Alternatively, plug door 120 can be moved out, but otherwise held in place, and plug door 110 opened and slid in back of it.

The structure shown in FIGURE 11 can be readily adapted to support a combination of sliding doors and plug doors. Thus, plug door 110 can be replaced with a sliding door and a smooth interior still be obtained by use of a plug door 120 which can be regulated to move inwardly when closed so that its interior surface will be planar with the interior surface of the sliding door.

FIGURES 12 to 12c show some of the positions the doors of the vehicle of FIGURE 10 can take in loading or unloading. FIGURE 12 shows the vehicle with all doors closed and providing a smooth interior. Plug doors 80 and 81 when opened can slide over sliding doors 70 and 71 from one end of the car to the other i.e. with each door being able to move about one-half the length of the car. Each door can thus occupy any one of three positions out of a possible four when placed in a closed position. FIGURE 12a shows all four doors 70, 71, 80 and 81 at one end of the vehicle; FIGURE 12b shows doors 70 and 80 at one end and doors 71 and 81 at the other end of the vehicle; and FIGURE 12c shows doors 70, 71, 80 and 81 located in the center of the vehicle. The four plug doors 90, 91, 95 and 96 on the other side of the vehicle can be similarly positioned. Thus, plug doors 95 and 96 can be opened and rolled over plug doors 90 and 91 to the various positions shown in FIGURES 12a to 12c. All the doors described and employed in this invention are commercially available and the details of their construction is not part of this invention. The Youngstown Steel Door Company, Youngstown, Ohio is one source of doors which can be used in forming vehicles according to this invention.

The vehicles of this invention having all plug doors on both sides are particularly useful. Since plug doors move outwardly when being opened they move away from the contents therein. Clearance is thus provided between the door and the contents so that they are far less likely to be restrained against subsequent rolling movement than conventional sliding doors. No such clearance can be obtained so readily when the contents shifts position during transport and presses with a binding force against a sliding door thereby restraining rolling it open. This, of course, can be prevented by use of suitable tie down means during loading but labor and materials are involved in doing this. With an all plug door vehicle many products can be shipped without the use of any, or far less, tying down than would be possible in a vehicle having sliding doors. The shipper thus can load more quickly and realize significant savings.

The number of doors on each side of the freight vehicle can vary according to the length of the vehicle. Generally, however, there will be at least two doors, with four or six doors being most suitable, on each side. In addition, by arranging the doors to roll or slide on three or more tracks even greater than up to one-half of the vehicle side can be opened at any one time.

The novel vehicle structure of this invention provides an exceptionally rigid frame or structural shell. The roof supporting trusses or beams function as compression members as the vehicle is loaded and help to minimize the deflection of the center and side sills. Also, when a load is applied against one bulkhead, as happens when a train stops quickly or the vehicle is being coupled during a switching operation, the roof supporting trusses or beams function as tension members and transfer part of the force to the other bulkhead.

What is claimed is:
1. A freight car comprising in combination:
    an underframe including parallel side sills, end sills and a floor on said underframe;
    a vertical bulkhead projecting upwardly from each end of the underframe, said bulkheads being essentially planar on the side internal of the car;
    a plurality of spaced apart trusses parallel to one another extending from one bulkhead to the other bulkhead with the ends of the trusses being joined near the top thereto and supported by the bulkheads, said trusses constituting the entire supporting means for roof structure on the car;
    a plurality of spaced apart roof rafters parallel to one another supported by the trusses in a direction substantially normal thereto, the rafters having a horizontal center portion supported by the trusses and declined cantilevered portions projecting therefrom;
    a longitudinal side plate on each side of the freight car supported by and joined to the rafter proximal ends and extending to each bulkhead, said side plates forming horizontal eaves parallel to the side sills;
    roof plates on the rafters; and
    a plurality of movable door members forming closures between the side plates and side sills for essentially the entire distance between the bulkheads on both sides of the freight car.
2. A freight car comprising in combination:
    an underframe including parallel side sills, end sills and a floor on said underframe;
    a vertical bulkhead projecting upwardly from each end of the underframe, said bulkheads being essentially planar on the side internal of the car;
    a plurality of spaced apart trusses parallel to one another extending from one bulkhead to the other bulkhead with the ends of the trusses being joined near the top thereto and supported by the bulkheads, said trusses constituting the entire supporting means for roof structure on the car;
    a plurality of spaced apart roof rafters parallel to one another supported by the trusses in a direction substantially normal thereto, the rafters having a horizontal center portion supported by the trusses and declined cantilevered portions projecting therefrom;
    a longitudinal side plate on each side of the freight car supported by and joined to the rafter proximal ends and extending to each bulkhead, said side plates forming horizontal eaves parallel to the side sills;
roof plates on the rafters; and
a plurality of movable door members forming closures between the side plates and the side sills for essentially the entire distance between the bulkheads on both sides of the freight car, said door members being movably supported top and bottom by track means on the side plates and side sills.

3. A freight-carrying vehicle according to claim 12 in which each side of the vehicle for substantially the entire distance between the bulkheads has a plurality of movable doors which when all in closed position provide a completely closed side with a substantially smooth interior substantially planar vertical surface extending between the bulkheads.

4. A freight-carrying vehicle according to claim 3 in which all the doors on each side of the vehicle are plug doors.

5. A freight-carrying vehicle according to claim 2 in which the doors on each side of the vehicle are part plug doors and part sliding doors.

6. A freight-carrying vehicle comprising:
an underframe, including side sills, end sills and a floor on said underframe;
a vertical bulkhead projecting upwardly from each end of the underframe;
a plurality of spaced apart open-webbed trusses parallel to one another extending from one bulkhead to the other bulkhead with the ends of the trusses being joined near the top thereto;
a longitudinal side plate on each side of the vehicle extending between the upper corners of the bulkheads;
a reinforced roof structure of roof plates extending from and between the side plates and supported on the trusses, said roof structure being supported by the trusses without supplementary side wall or internal column support; and
a plurality of movable door members on each side of the vehicle forming closures between the side plates and side sills for essentially the entire distance between the bulkheads.

7. A freight-carrying vehicle according to claim 6 in which the roof structure has a horizontal center portion supported by the trusses and declined cantilevered portions projecting therefrom to the side plates.

8. A freight-carrying vehicle according to claim 6 having a plurality of stringers positioned normal to, and supported by, the trusses and joined to the side plates.

9. A freight-carrying vehicle comprising:
an underframe, including side sills, end sills and a floor on said underframe;
a vertical bulkhead projecting upwardly from each end of the underframe;
a plurality of spaced apart open-webbed trusses parallel to one another extending from one bulkhead to the other bulkhead with the ends of the trusses being joined near the top thereto;
a longitudinal side plate on each side of the vehicle extending between the upper corners of the bulkheads;
a reinforced roof structure of room plates extending from and between the side plates and supported on the trusses, said roof structure being supported essentially only by the trusses without internal column support; and
a plurality of movable door members on each side of the vehicle forming closures between the side plates and side sills for essentially the entire distance between the bulkheads.

10. A freight-carrying vehicle comprising:
an underframe, including side sills, end sills and a floor on said underframe;
a vertical bulkhead projecting upwardly from each end of the underframe;
a plurality of spaced apart bar-joist trusses parallel to one another extending from one bulkhead to the other bulkhead with the ends of the bar-joist trusses being joined near the top thereto;
a longitudinal side plate on each side of the vehicle extending between the upper corners of the bulkheads;
a reinforced roof structure of roof plates extending from and between the side plates and supported on the bar-joist trusses, said roof structure being supported by the bar-joist trusses without supplementary side wall or internal column support; and
a plurality of movable door members on each side of the vehicle forming closures between the side plates and side sills for essentially the entire distance between the bulkheads.

11. A freight-carrying vehicle comprising:
an underframe, including parallel side sills, end sills and a floor on said underframe;
a vertical bulkhead projecting upwardly from each end of the underframe, said bulkheads being essentially planar on the side internal of the vehicle;
a plurality of spaced apart open-webbed trusses parallel to one another extending from one bulkhead to the other bulkhead with the ends of the trusses being joined near the top thereto and supported by the bulkheads;
a longitudinal side plate on each side of the vehicle extending between the upper corners of the bulkheads, said side plates forming horizontal eaves parallel to the side sills;
a reinforced roof structure of roof plates extending from and between the side plates and supported on the trusses, said roof structure being entirely supported by the trusses without supplementary side wall or internal column support; and
a plurality of movable plug-doors on each side of the vehice consisting of the only closures between the side plates and side sills for essentially the entire distance between the bulkheads on both sides of the freight vehicle, said door members being movably supported top and bottom by track means on the side plates and side sills, said plug-doors when all in closed position providing a completely closed side with a substantially smooth interior substantially planar vertical surface extending between the bulkheads.

12. A freight-carrying vehicle according to claim 11 having a plurality of stringers positioned normal to, and supported by, the trusses and joined to the side plates.

References Cited

UNITED STATES PATENTS

| | | | |
|---|---|---|---|
| 1,850,283 | 3/1932 | Martin | 105—404 |
| 2,760,446 | 8/1956 | Watter | 105—404 |
| 2,942,561 | 6/1960 | Cheshire | 105—404 |
| 3,191,550 | 6/1965 | Adler et al. | 105—404 |

ARTHUR L. LA POINT, Primary Examiner

R. A. BERTSCH, Assistant Examiner

U.S. Cl. X.R.

105—378

PO-1050
(5/69)

UNITED STATES PATENT OFFICE
CERTIFICATE OF CORRECTION

Patent No. 3,478,701  Dated November 18, 1969

Inventor(s) H. C. Woodman et al

It is certified that error appears in the above-identified patent and that said Letters Patent are hereby corrected as shown below:

Column 2, line 35, "wtihcut" should be -- without --.
Column 7, line 10, "12" should be -- 2 --; line 62, "room" should be -- roof --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents